Patented Sept. 5, 1933

1,925,255

UNITED STATES PATENT OFFICE 1,925,255

CEREAL FOOD

Will K. Kellogg, Battle Creek, Mich., assignor to Kellogg Company, Battle Creek, Mich., a corporation of Delaware No Drawing. Application May 18, 1929, Serial No. 364,327. Renewed June 30, 1933

1 Claim. (Cl. 99—10)

My invention relates to cereal food and specifically to a bran and wheat biscuit.

One of the objects of my invention is to provide a new ready-to-eat cereal food in which the desirable qualities of a wheat biscuit are supplemented by the laxative qualities and added mineral constituents of wheat bran. The food is further improved by the addition of suitable flavoring materials.

A further object is to provide a method of making a shredded biscuit from wheat and bran, in which the wheat and bran will be thoroughly permeated with the flavoring material. In methods at present employed, the shredded biscuits have not been properly impregnated with flavoring material because of the difficulty of causing the flavoring material to penetrate the outer coating of the kernel of the grain. In my improved process the outer coating of the wheat kernels or grain is ruptured to expose the interior of the grains. These crushed grains are mixed with the bran and with the liquid containing the flavoring material prior to the first cooking step, so that the crushed grain and bran become thoroughly permeated with the flavoring material.

In a general way it may be stated that a quantity of uncooked cereal—wheat, for example—is crushed or broken in any suitable form of crusher so as to break the coating and expose the interior of the grain without, however, reducing the grain to a flour. This crushed grain is then mixed with a quantity of bran and liquid containing suitable flavoring material, and the mixture is placed in a suitable cooker which may, if desired, be a pan retort, rotary pressure cooker or other suitable apparatus. After the mixture has been cooked sufficiently, it is removed from the cooker and partially cooled and dried in any suitable form of dryer, after which it is broken up and ground in any suitable grinder until it becomes mealy in form. The cooked and ground product may then be tempered in a tempering vat to secure a uniform moisture content throughout and may then be passed through suitable shredding rolls. The shreds from a number of shredding rolls may be combined and formed into biscuits by means well known in this art, and the formed biscuits may then be dried and toasted in any suitable toasting apparatus.

I will now describe in detail the method used in forming a specific product, although it will, of course, be understood this is by way of example only and that variations might be made in proportions of the materials used, in the length of time of the steps of the process, the temperatures and moisture contents specified, and that some of the steps might be omitted in forming certain products. In the specific example in question, 50 lbs. of uncooked wheat is crushed in any suitable crusher to break the coating and expose the interior of the kernels but not to form a flour. This crushed wheat is mixed with 50 lbs. of bran, 3 gals. of water, 6 lbs. of sugar and 2 lbs. of salt, and the mixture is placed in a rotary steam pressure cooker where it is cooked at a pressure of 15 lbs. for an hour and a half. The cooked mixture as it comes from the cooker may contain from about 30 to 35 percent moisture, and it is then cooled and dried down until it contains from about 18 to 24 per cent moisture. The cooked dried mixture is then ground until it is about the consistency of ordinary corn meal and is thereafter dried and tempered in a tempering vat so that the moisture becomes evenly disseminated throughout the mass and the moisture content is about 20 percent. The ground and tempered mixture is then passed through shredding rolls and the shreds are combined and formed into shredded biscuits in the usual well known manner.

I claim:

A method of making a wheat-bran product comprising crushing a quantity of whole wheat to break the coating and expose the interior without reducing the wheat to flour, mixing with the crushed wheat a quantity of bran, water and flavoring material, cooking the mixture under steam pressure to cause the substance of the crushed wheat and bran to become permeated with the flavoring material, drying the cooked mixture until it contains from about 18 to 24% moisture, grinding the material to a mealy form, tempering the material to evenly disseminate the moisture throughout the mass, passing the dried, ground, cooked mixture through shredding rolls, combining the shreds into biscuit form, and toasting them to produce a toasted shredded biscuit.

W. K. KELLOGG.